United States Patent [19]
Miller

[11] Patent Number: 6,123,539
[45] Date of Patent: Sep. 26, 2000

[54] DIE ASSEMBLY FOR MAKING A PROPELLER STRUCTURE

[75] Inventor: Daniel T. Miller, Greenville, Wis.

[73] Assignee: Brunswick Corporation, Lake Forest, Ill.

[21] Appl. No.: 09/199,962

[22] Filed: Nov. 25, 1998

[51] Int. Cl.[7] .................................................... A23P 1/00
[52] U.S. Cl. ......................... 425/589; 249/109; 425/441; 425/443; 425/450.1; 425/DIG. 58
[58] Field of Search ............................. 249/109; 425/441, 425/443, 450.1, 589, DIG. 58

[56] References Cited

U.S. PATENT DOCUMENTS

| | | | |
|---|---|---|---|
| 4,043,385 | 8/1977 | Petrenchik | 164/342 |
| 4,243,199 | 1/1981 | Hill | 425/DIG. 58 |
| 4,414,171 | 11/1983 | Duffy et al. | 264/249 |
| 4,524,943 | 6/1985 | Busch et al. | 249/63 |
| 4,975,041 | 12/1990 | Fries et al. | 425/547 |
| 5,597,593 | 1/1997 | Lebensfeld et al. | 425/441 |
| 6,029,944 | 2/2000 | Saner et al. | 249/109 |

*Primary Examiner*—James P. Mackey
*Attorney, Agent, or Firm*—William D. Lanyi

[57] ABSTRACT

A die assembly apparatus is provided with a plurality of die segments that move on guides from open to closed positions. Movement from the open to the closed positions for each die segment is along the path that extends inward toward a central axis and toward a base plate. A compression member provides a retaining force along the central axis to compress the die segments between limited surface areas at the top and bottom portions of the die segments. Molten wax is injected into an injection port so that the molten wax is first introduced into the die cavity at the bottom portion of the die cavity. Hydraulic actuators are used to move the die segments from the open to the closed positions and vice versa.

11 Claims, 6 Drawing Sheets

DIE ASSEMBLY FOR MAKING A PROPELLER STRUCTURE

BACKGROUND OF THE INVENTION

1. Field of the Invention

The present invention is generally related to a die assembly apparatus and, more particularly, to a die assembly apparatus that uses hydraulic actuators and is configured to reduce cost and improve the manufacturing process for making a wax propeller.

2. Description of the Prior Art

It is well known that certain objects can be manufactured by injecting a molten material into a die assembly that can typically comprise two or more die assembly segments that define a cavity therein. Skilled artisans in the field of molding and casting are very familiar with many different techniques related to injection molding and die casting procedures.

U.S. Pat. No. 4,043,385, which issued to Petrenchik on Aug. 23, 1977, discloses a molding apparatus. The apparatus is intended for use in molding components such as turbine blade assemblies and the like without the use of complex multipart molds. It comprises first and second mold halves carried by cooperating platens for relative movement toward and away from one another along a path. A connecting assembly is provided for attaching the first mold half to its respective platen in a manner which permits it to have free movement in directions perpendicular to the path and rotary movement about an axis parallel to the path. Additionally, a control assembly is provided to cause the first mold half to undergo predetermined transverse and rotary movement during movement along the path toward and away from the second mold half.

U.S. Pat. No. 4,414,171, which issued to Duffy et al on Nov. 8, 1983, describes a method for making an injection molded propeller. The method relates to the manufacture of an inexpensive injection molded propeller for mounting on a drive shaft. The drive shaft is attached to the hub of the propeller by a chemical and thermal shrink fit and by deformation due to the rotational forces of the propeller thereby producing a positive locking hub on the drive shaft. The propeller may be used, not only for remote piloted missiles and aircraft, but can also be used with different types of boat inboard and outboard drives, vehicles and equipment requiring a propeller having a positive locking system for securing the propeller or the like to the drive shaft.

U.S. Pat. No. 4,524,943, which issued to Busch et al on Jun. 25, 1985, describes an injection mold for the manufacture of sealing elements consisting of elastic material and having undercuts, particularly sealing bellows for joints, for example ball joints in automotive vehicles, including followers which are divided centrally in the longitudinal direction of the sealing element and form the outer contour. The mold has a core plunger which forms the inner contour and is divided into an upper core plunger part and a lower core plunger part which are movable relative to each other. The sealing element is removed from the foregoing parts after the opening of the followers. In order to be able to remove the sealing element automatically from the mold without the use of parting agent the followers are split in transverse direction into an upper and a lower pair of followers in the region between the inner undercut of smallest diameter and the outer undercut of smallest diameter. The pairs of followers are movable independently of each other for successive gripping of the sealing element during the opening of the mold.

U.S. Pat. No. 4,975,041, which issued to Fries et al on Dec. 4, 1990, discloses a die assembly for die casting a propeller structure. The die assembly is used for casting a propeller structure, such as a wax propeller pattern. The pattern, which is identical in configuration to a cast metal propeller to be produced, includes a generally cylindrical hub having an outwardly flared end and a plurality of blades which project outwardly from the hub. The die assembly includes a base plate and a lower core section extends upwardly from the base plate through an opening in a stripper plate, which is mounted for movement towards and away from the base plate. A plurality of die sections are mounted for generally radial sliding movement on the stripper plate from an outer open position to a closed position where they define a die cavity with the core section. The die assembly also includes an upper die unit that is mounted for vertical movement and has a cavity in its lower surface which receives the upper ends of the die sections when in the closed position. An upper core section is carried by the upper die unit and meets with the lower core section when the upper die unit is lowered into interlocking relation with the die sections. Liquid wax is introduced through an ingate to the die cavity to form the wax propeller pattern. A mechanism is provided to rotate the lower core section and the wax pattern after the die sections have been moved to the open position to move the blades of the pattern to facilitate axial removal of the pattern.

All of the above United States patents described above are hereby explicitly incorporated in this description of the present invention.

Die assembly apparatus for manufacturing wax propeller structure patterns which are known to those skilled in the art present two disadvantages. First, the die assembly is typically very heavy and expensive to manufacture. Secondly, known techniques for filling the die cavity with molten wax leave certain imperfections in the finished wax pattern because of the manner in which the molten wax is typically injected into the mold cavity.

It would therefore be significantly beneficial if a die assembly structure could be provided which is lighter in weight, less expensive to manufacture, and able to produce wax patterns that do not exhibit the imperfections that currently exist when known die assemblies are used.

SUMMARY OF THE INVENTION

A die assembly apparatus for making a component from molten material, in a preferred embodiment of the present invention, comprises a base plate and a plurality of die segments which are combinable to form a die assembly with an internal cavity shaped to define the component, such as a propeller pattern made of wax. The present invention also comprises a plurality of guides attached to the base plate wherein each of the plurality of guides is configured to define an associated one of a plurality of paths along which an associated one of the plurality of die segments can travel. Each of the associated paths extend from an open position away from other ones of the plurality of die segments to a close position proximate the other ones of the plurality of die segments. The die segments are combined to form a die assembly when all of the plurality of die segments are in the closed position. Movement from the open position to the closed position for each one of the plurality of die segments is in a direction toward the base plate. The present invention further comprises a compression member that is movable relative to the base plate. The compression member is configured to exert a force on the die assembly by moving toward the base plate with the die assembly disposed between the base plate and compression member.

In a particularly preferred embodiment of the present invention, a plurality of hydraulic actuators are provided, wherein each of the plurality of hydraulic actuators is attached to an associated one of the die segments and is configured to be pressurized in order to move the associated die segment from the closed position to the open position and is also configured to be depressurized to move the associated one of the plurality of die segments from the open position to the closed position.

Each of the hydraulic actuators has its pressure chamber attached to one of the die segments and its shaft attached to the base plate. The shaft acts as a fixed guide, within the pressure chamber, and the pressure chamber moves in response to changes in the pressure of the hydraulic fluid within the pressure chamber. The die assembly has at least one injection port disposed more proximate to the base plate than to the compression member. The injection port is connectable in fluid communication with the cavity to conduct the molten material from an external source to the cavity. When the molten material is conducted from the external source to the cavity, the compression member can be disposed above the base plate or, in alternative applications of the present invention, the compression member can be disposed below the base plate. In a typical application of the present application, the molten material is wax and the component is a marine propeller. The present invention can comprise four independently movable die segments in certain embodiments and, in other embodiments, can comprise three independently movable die segments.

As will be described in detail below, the present invention differs from the prior art in several distinct ways. First, the guides which determine the paths along which the die segments move from an open position to a closed position, and vice versa, are sloped downward towards a central position and toward the base plate. In other words, as the die segments move toward each other, they also move toward the base plate. This is generally opposite to the techniques disclosed in U.S. Pat. No. 4,975,041 which is discussed above. In addition, the present invention uses hydraulic actuators to move the die segments from the open position to the closed position, and vice versa. In the prior art, air cylinders have been used. The hydraulic actuators used in conjunction with the present invention are typically not double acting cylinders in the sense that hydraulic pressure is provided at one or the other sides of a piston to move the piston in a preferred direction. Instead, the hydraulic fluid used in conjunction with the hydraulic actuators in the present invention is forced into a single pressure chamber for each actuator to move an associated die segment from the closed position to an open position. To reverse that movement, oil is withdrawn from that single opening within the pressure chamber of the actuator and the die segment moves from the open position to the closed position partially under the influence from gravity and partially under the influence of the reduced pressure in the pressure chamber which draws the shaft toward the evacuated end of the chamber of the actuator.

Another distinct difference between the present invention and the prior art is that the molten material, such as wax, is injected into the portion of the cavity that is closest to the base plate. In a typical application, when the base plate is below the compression member, this causes the molten wax to fill the cavity from the bottom portion of the cavity toward the top portion of the cavity. As will be described in greater detail below, this serves an important purpose of avoiding certain imperfections in the finished wax pattern.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Figure 1:
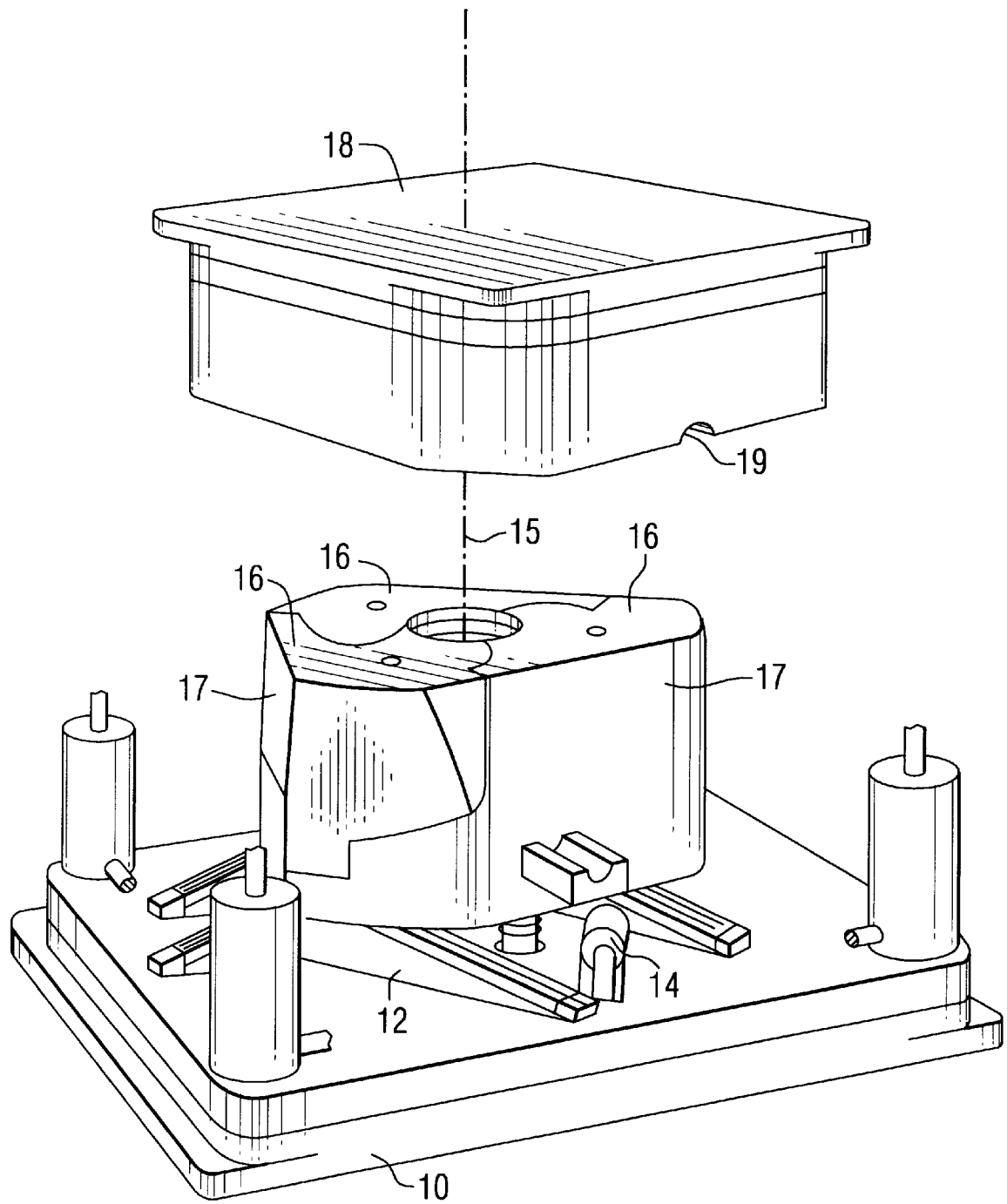
FIGS. 1 and 2 show a die assembly which is known to those skilled in the art.

Throughout the description of the preferred embodiment, like components will be identified by like reference numerals.

FIG. 1 is a reproduction of an illustration from U.S. Pat. No. 4,975,041. In view of the fact that the operation of the die assembly apparatus is specifically described in U.S. Pat. No. 4,975,041, along with the manufacturing techniques for making metallic propellers from wax patterns, those procedures and components will not be described herein.

In FIG. 1, a base plate 10 is provided with a plurality of guides 12 that are moved in response to pressure changes in pneumatic cylinders 14. Three die segments 16 are shown in their respective closed positions where they combine to form a die assembly which defines an internal cavity. The outer surfaces 17 of each of the die segments are slightly tapered so that the compression member 18 will tend to force the die segments 16 together when the compression member 18 is moved downward in FIG. 1 to compress a die assembly between itself and the base plate 10. An injection port 19 is provided in the compression member 18 and defines a path along which molten material travels from an external source to the internal cavity within the die assembly.

In a typical operation using the prior art die assembly shown in FIG. 1, the die segments 16 are forced, by pneumatic cylinders 14, inwardly toward each other to define the configuration shown in FIG. 1. When the die segments 16 are moved into contact with each other, the compression member 18 is lowed to perform two simultaneous functions. First, sloped inner surfaces in the compression member 18 push against sloped surfaces 17 to force the die segments 16 into more intimate contact with each other. Also, the downward force of the compression member 18 compresses the die assembly between the base plate 10 and compression member 18. After the compression member 18 is in position as described above, molten material, such as wax, is forced into the injection port 19 to travel into the cavity in the central portion of the die assembly.

Figure 2:
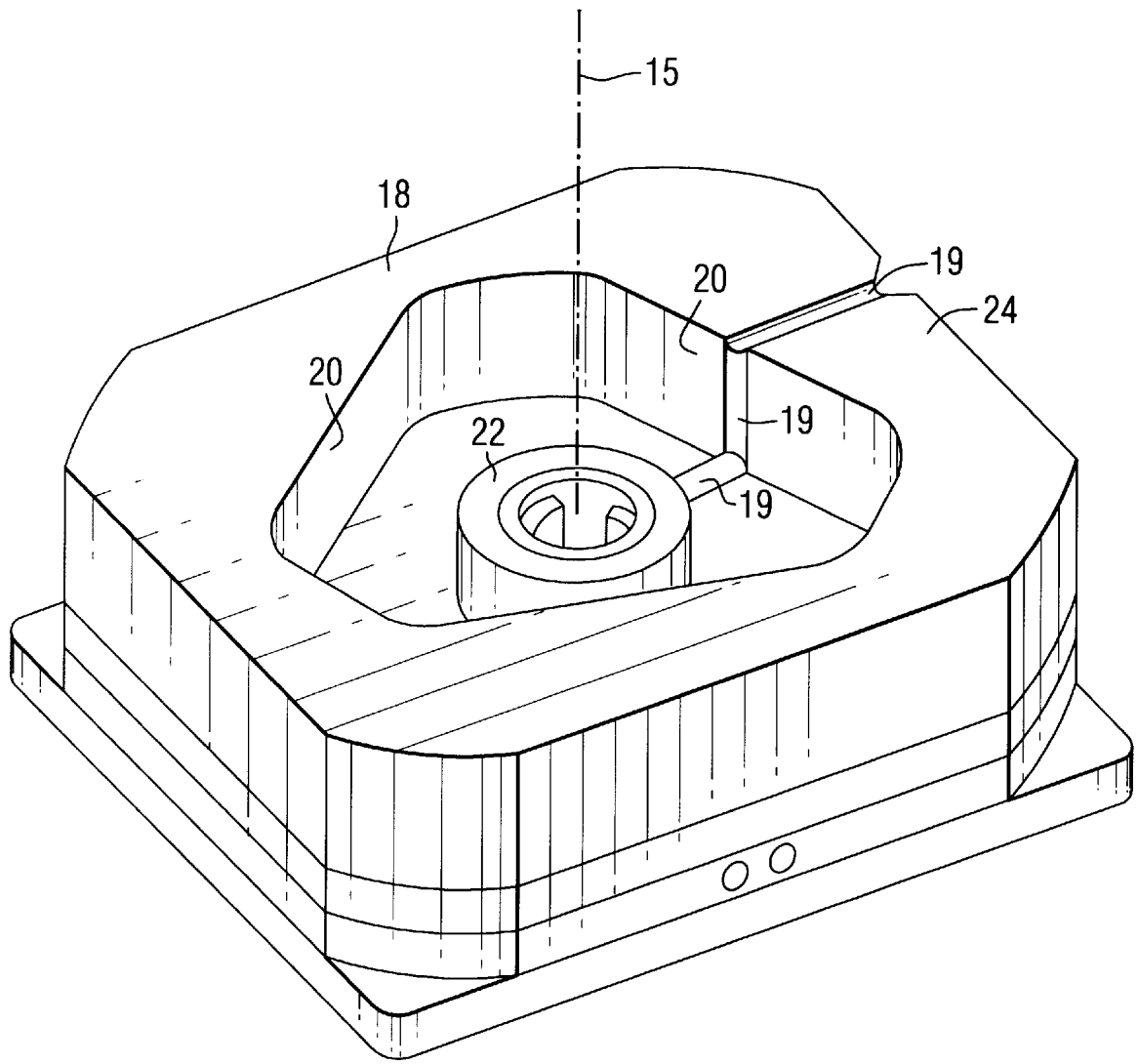

FIG. 2 shows the compression member 18 turned upside down to reveal its internal structure. Sloped surfaces 20 slide along surfaces 17 in FIG. 1 as the compression member 18 is forced downward towards the base plate 10. A central structure 22 of the compression member 18 and another structure attached to the base plate 10 combine to assist in properly forming the internal portions of the finished component when the molten material is injected into the cavity of the die assembly. U.S. Pat. No. 4,975,041 describes these shapes in greater detail and also discusses their function.

Therefore, the specific function of these centrally located structures will not be described herein.

With continued reference to FIG. 2, the injection port 19 provides a conduit along the lower face 24 of the compression member 18 and upward to conduct the flow of molten material toward the top portion of the cavity. It should be noted that FIG. 2 shows the compression member 18 in an upside down position. With reference to both FIGS. 1 and 2, it should be understood that after injection into the injection port 19, the molten material flows inward toward centerline 15 and then upward away from the base plate 10 until it is again directed radially toward centerline 15 where it enters the upper portion of the cavity within the die assembly. After the molten material solidifies in the cavity, the air cylinders 14 are used to pull the die segments 16 away from centerline 15 and downward toward the base plate 10, along the guides 12. It should be noted that as the die segments 16 move from the closed position shown in FIG. 1 to an open position, the die segments 16 move radially outward away from centerline 15 and downward towards base plate 10 because of the slope of the guides 12. In other words, to maintain the die assembly in a closed position, constant force must be exerted by the pneumatic cylinders 14. This force provided by the cylinders 14 also must counteract the tendency of the die segments 16 to move away from each other at the bottom portion of each die segment because of the internal forces generated by the sloped surfaces 17 and 20 that tend to compress the die segments 16 together at their upper portions and spread them at their bottom portions. Because of the forces acting upon the die segments 16, it has been necessary to make the die segments from relatively thick stock to withstand the compressive forces that they experience. In addition, as the compression member 18 moves downward toward the base plate 10, the sliding of surfaces 17 and 20 on each other have a tendency to gall both surfaces. This reduces the life of the die assembly components. Also reducing the useful life of the die assembly is the fact that the downward force exerted by the compression member 18 tends to compress the guides 12 between the die segments 16 and the base plate 10. Since the guides 12 must be accurately machined to precisely control the movement of the die segments 16, the force exerted by the compression member 18 will eventually damage the guides 12 and they will have to be replaced periodically.

Figure 4:
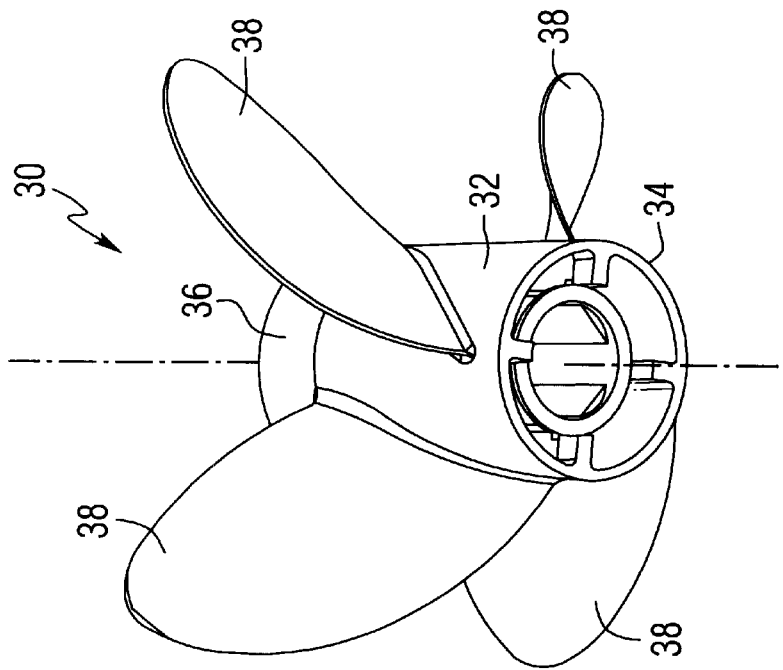
FIGS. 3 and 4 show two views of a propeller for which a wax pattern can be made by using the present invention.
Figure 3:
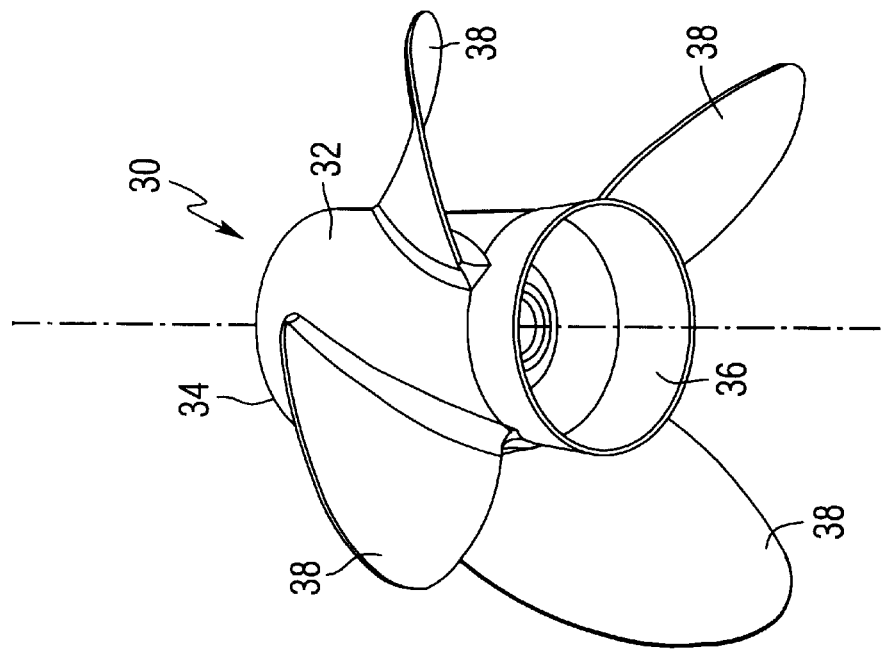

FIGS. 3 and 4 show two views of a propeller structure 30. The propeller structure 30 has a hub 32 with a forward end 34 and an aft end 36. Four blades 38 extend from the hub 32. Several important characteristics of the blade assembly 30 should be noted. First, the aft end 36 is flared and has a relatively thin wall. On the other hand, the forward end 34 is not flared and has a thicker wall structure. Therefore, it is advisable to inject the molten material into the portion of the cavity in a die assembly that represents the forward end 34 of the propeller structure 30. If the propeller structure 30 is intended to be manufactured with the flared aft end 36 downward in the cavity, the molten wax would be injected at the upper portion of the cavity. On the other hand, if the propeller structure 30 is intended to be manufactured with the aft end 36 extending upward in the cavity, the molten wax would be injected into the bottom portion of the cavity. In both situations, the molten wax is injected into the cavity portion where the forward end 34 of the propeller structure 30 is intended to be formed.

One problem that occurs when wax propellers are made in accordance with the prior art, as described above in conjunction with FIGS. 1 and 2, is that the molten wax is injected at the upper portion of the cavity within the die assembly and tends to flow downward along the walls of the cavity toward the bottom portion of the cavity. Therefore, some of the wax actually flows downward along the walls of the cavity toward its bottom prior to the remainder of the cavity being filled with wax. The wax that is initially injected into the cavity therefore has an opportunity to begin its solidification at the bottom of the cavity prior to the rest of the cavity being filled with molten wax. Later, as molten wax is injected to fill the remaining portion of the cavity, it can confront a partially solidified wax body that has already formed in the bottom portion of the cavity. Where these two wax fronts meet, a malformation can occur where molten wax moves into contact with partially solidified wax. Under certain circumstances, wax can flow along the walls of the cavity on both surfaces of each blade 38 so that, when the wax solidifies along the walls of the cavity, a porous blade structure can result. Although many of these malformations of the wax patterns are correctable by manually finishing the surfaces of the wax propeller pattern, this manual operation adds expense to the total process. In addition, certain malformations resulting from the downward injection of wax into the mold can result in deformities that are not easily correctable by manual operation.

Figure 5:
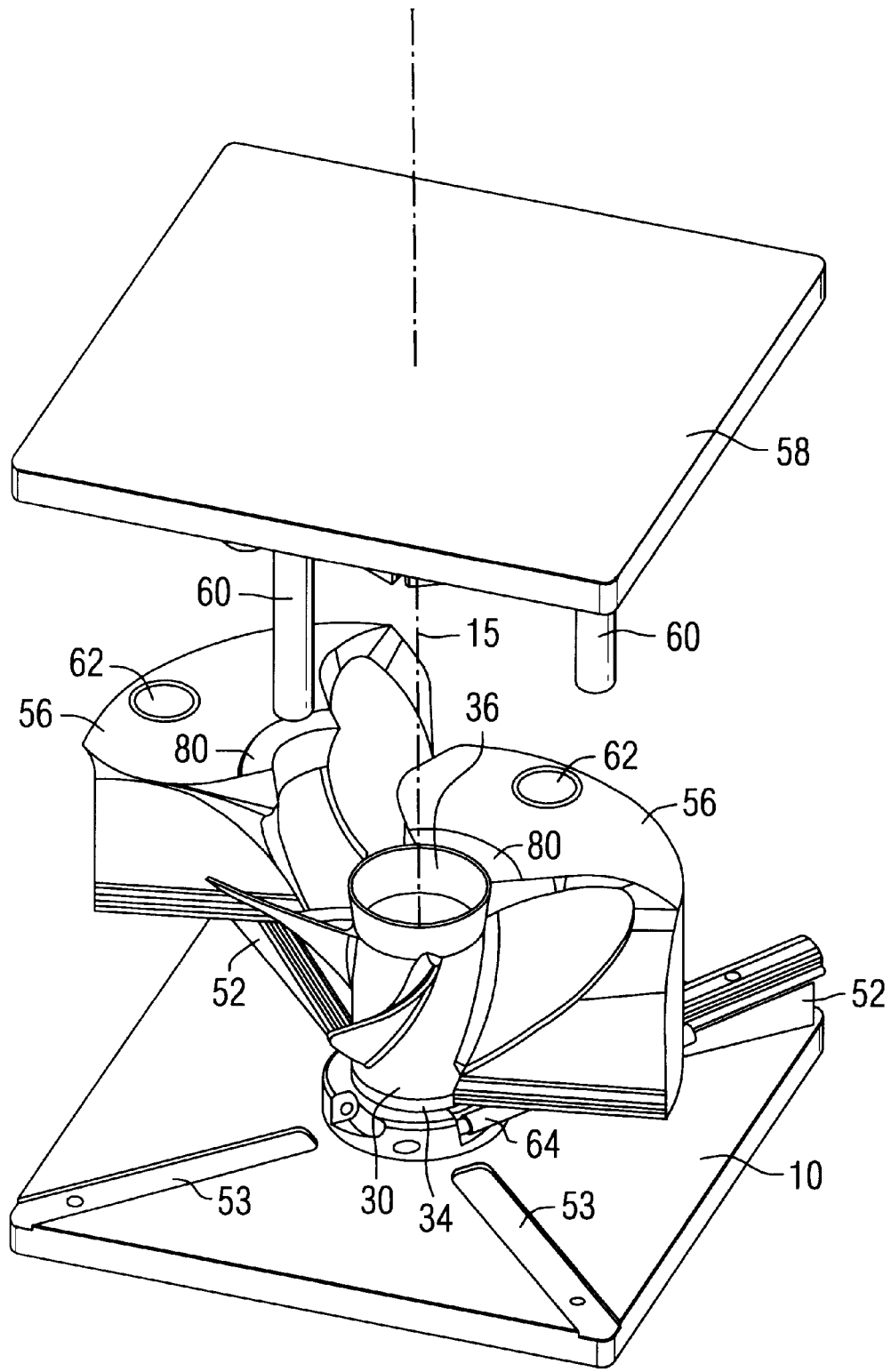
FIG. 5 shows a base plate and compression member of the present member.

FIG. 5 shows one embodiment of the present invention. The base plate 10 has a plurality of guides 52 attached to it. In FIG. 5, only two guides 52 are shown attached to the base plate 10. However, it should be understood that two other guides 52 would be attached to the base plate 10 at the locations identified by reference numeral 53. One of the die segments 56 is shown in its closed position and the other die segment 56 is shown in an open position. A wax pattern of a propeller structure 30 is shown in the position that it would occupy after the injected molten wax has solidified and the die segments 56 are withdrawn to their open positions to allow removal of the wax pattern. As can be seen in FIG. 5, the aft end 36 is extending upward and a forward end 34 is extending downward to permit injection of the molten wax into the bottom portion of the cavity.

With continued reference to FIG. 5, the inwardly facing surfaces of the die segments 56 represent surfaces of the propeller pattern. Some of these contours can be seen on the open die segment 56. The compression member 58 is withdrawn upward and away from the base plate 10 to permit removal of the wax pattern of the propeller structure 30. Shafts 60 are shaped to be received in holes 62 formed at least partially through the height of the die segments 56. These shafts 60 are not required in all embodiments of the present invention.

Comparing FIGS. 1 and 5, it can be seen that the guides 52 of the present invention slope downwardly and toward the centerline 15, whereas the guides 12 in FIG. 1 slope upwardly and toward centerline 15. As a result, when the base plate 10 is below the compression member 58, gravity assists the present invention in closing the die segments 56 toward each other to form the die assembly.

Also shown in FIG. 5 is a hydraulic actuator 64 attached to one of the die segments 56 and each actuator, in a preferred embodiment of the present invention, is an integral part of an associated segment 56. As will be described in greater detail below, the die segments 56 are moved toward their open position by injecting hydraulic fluid under pressure into the pressure chamber 64 to force the shaft away from the cylinder and, as a result, force the segment 56 away from the center of the assembly to open the apparatus. The pressure chamber of the hydraulic actuator 64 is attached to the die segment 56 for this purpose. Because of the assistance provided by gravity as a result of the slope of the guides 52, the die segments 56 can be moved toward their closed positions by evacuating the oil from the pressure chambers of the actuators 64 to cause the segments to move down the guides 52 toward the center of the assembly and close the apparatus.

Figure 6:
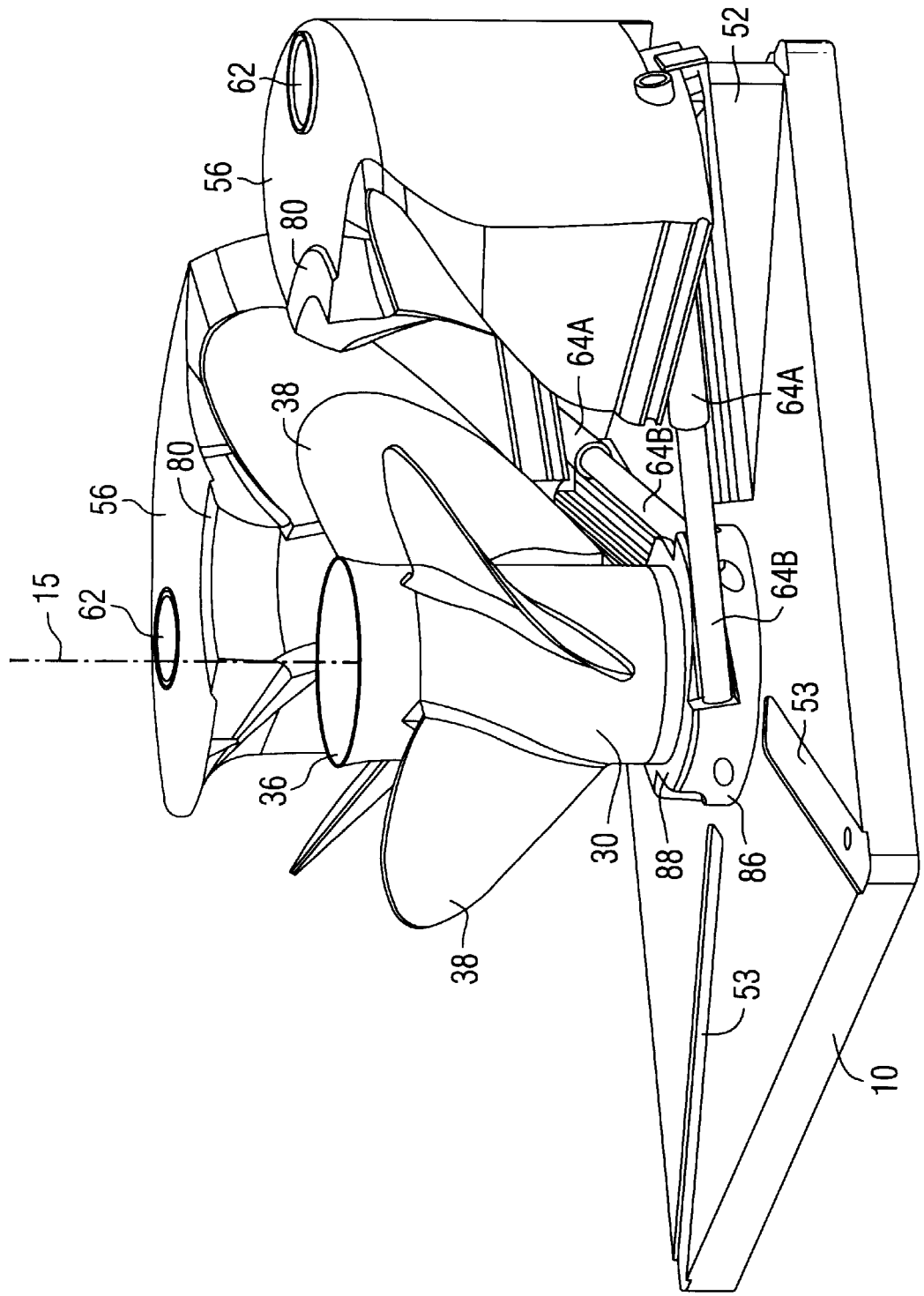
FIG. 6 shows the components of the present invention.

FIG. 6 shows the present invention with two die segments 56 in their open positions. As in the discussion with conjunction with FIG. 5, it should be understood that two other die segments 56 would be located around the propeller structure 30 to move in conjunction with the shape of guides 52 that would be placed at locations 53. In order to be able to more clearly illustrate the operation of the present invention, two of the guides 52 and two of the die segments 56 are not shown in FIG. 6.

The hydraulic actuator 64 described above in conjunction with FIG. 5 comprises a pressure chamber 64A and a shaft 64B. These are shown in FIG. 6 where the pressure chamber 64A is extended away from centerline 15 and away from the base plate 10 because of the angle of slope of the guides 52. When pressurized hydraulic fluid is injected into the pressure chamber at the distal end of the shaft 64B, the pressure chamber 64A is moved away from shaft 64B. Since the pressure chamber 64A is attached to the die segment 56, this pressurization causes the die segment 56 to move toward its open position as shown in FIG. 6. Conversely, if the hydraulic fluid in the pressure chamber 64A is depressurized by drawing hydraulic fluid out of the pressure chamber 64A, the die segment will move downward under the influence of this hydraulic fluid evacuation in conjunction with the influence of gravity because of the slope of the guides 52.

With reference to FIGS. 5 and 6, it can also be seen that each of the die segments 56 is provided with a raised bossed portion 80 which is annularly shaped and located radially inward on the upper surfaces of the die segments 56. When the compression member 58 is lowered into contact with the die segments 56, it makes contact with this raised annular boss and not with the radially outer portions of the upper surfaces of the die segments 56. When the die segments 56 are in their closed positions, the bottom surfaces of the die segments are moved to a position directly above the upper surface of the bottom pressure plate 86. The upper surface 88 of the pressure plate 86 defines the bottom portion of the cavity within the die assembly. When the compression member 58 moves downward to compress the die assembly between it and the base plate 10, the compressive force on the die segments 56 in a direction parallel to the central axis 15 is provided between the boss 80 and the upper surface 88 of the pressure plate 86. This confines the compressive forces on the die segments 56 to the region between these two opposing surfaces, 80 and 88, and does not affect the entire structure of the die segments 56. In addition, it isolates the forces on the base plate 10 and reduces the forces pressing downward to compress the guides 52. This extends the life of both the die segments 56 and the guides 52.

Figure 7:
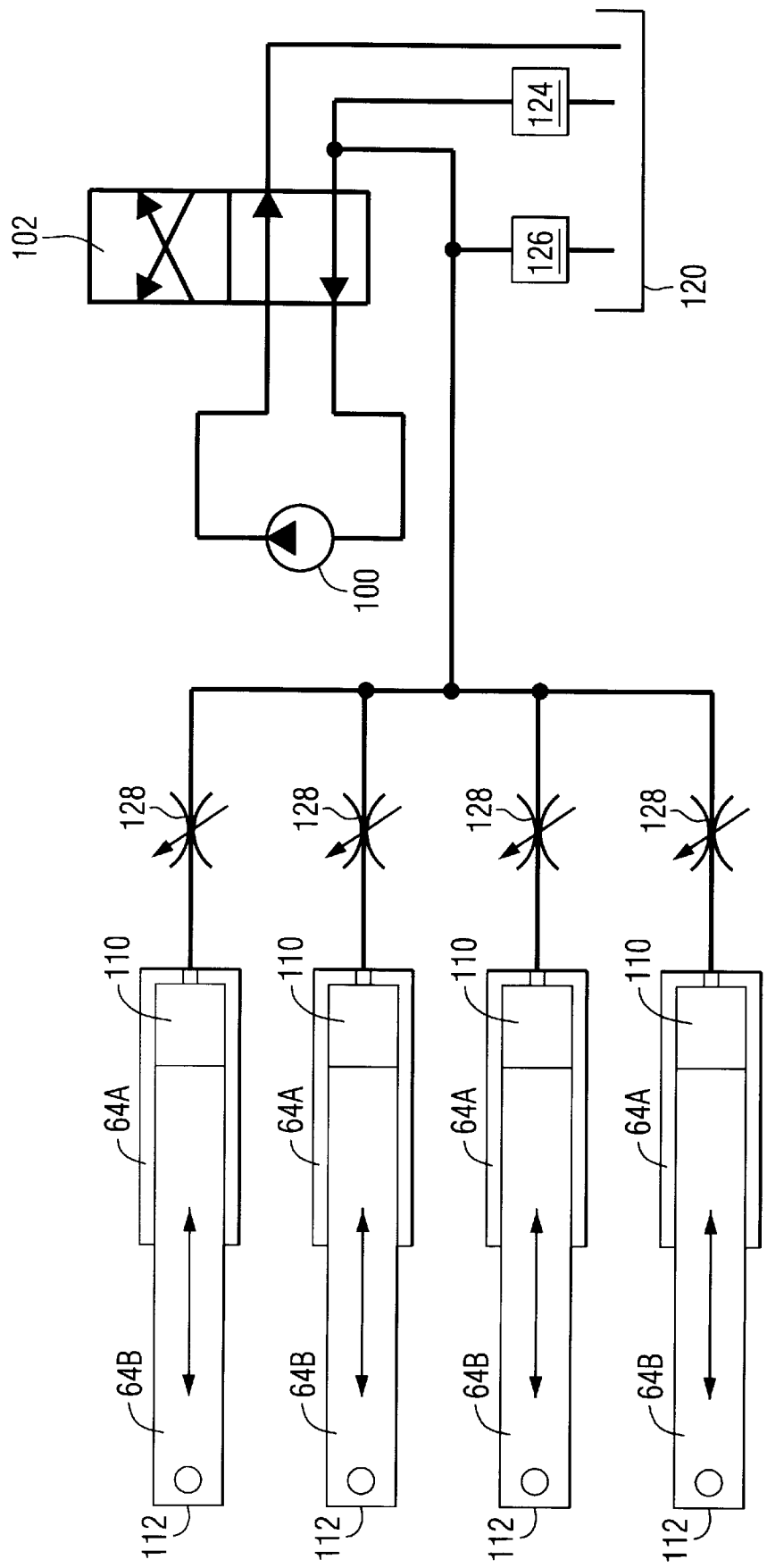
FIG. 7 shows a hydraulic circuit, in simplified schematic format, that can be used in conjunction with the present invention.

FIG. 7 illustrates a simplified schematic of a hydraulic circuit that can be used in conjunction with the present invention. Four hydraulic actuators are shown in FIG. 7 with their pressure chambers 64A and shafts 64B. A pump 100 is used to provide hydraulic fluid under sufficient pressure for use in full cycle operation of the hydraulic actuators. A control valve 102 is used to reverse the effect of the pressurized hydraulic fluid provided by the pump 100. When pressurized hydraulic fluid is injected into the openings 110 of the actuators, it forces the chambers 64A away from the shafts 64B. Since the ends 112 of the shafts 64B are attached to the base plate 10, as shown in FIG. 6, pressurization in region 110 will cause the pressure chambers 64A to move the die segments 56 away from centerline 15 and toward the open position. As described above, the pressure chambers 64A are attached to their respective die segments 56. When the control 102 is reversed, oil is drawn away from opening 110 in the pressure chambers 64A and the decreased pressure within the pressure chambers 64A tends to pull the pressure chambers back onto the shaft 64A. In addition, gravity assists the movement of the die segments 56 downward along the slope of the guides 52 and toward centerline 15 toward the closed position.

Also shown in FIG. 7 is a reservoir 120 in which a supply of hydraulic fluid is stored. An adjustable pressure relief valve 124 and a check valve 126 are provided to facilitate the operation of the hydraulic pumping system. Adjustable orifices 128 assist in controlling the speed of the die segments 56 between their open and closed positions.

With reference to FIG. 5, the base plate 10 is shown below the compression member 58. This is the typical and preferred configuration of the present invention during the manufacture of wax patterns. However, there is no limitation to the relative positions of the base plate 10 and pressure member 58. The assembly shown in FIG. 5 could be operated in an upside down configuration if that is desirable for any particular purpose. If this is done, the molten wax would be injected into the upper portion of the cavity and some of the advantages of the present invention would not be achieved. However, the slope of the guides 52 could be operated in a reversed configuration. Furthermore, the advantages achieved through the use of surfaces 80 and 82, is illustrated in FIG. 6, would be realized.

Although the present invention has been described with particular specificity and illustrated to show one preferred embodiment of the present invention, it should be understood that alternative embodiments are also within its scope. The present invention provides several advantages in comparison to the prior art. First, the die segments 56 are moved under the influence of hydraulic actuators rather than pneumatic cylinders. The use of hydraulic actuators results in a smoother action during the opening and closing movements of the die segments 56 as opposed to the more sudden lurching of the die segments when pneumatic cylinders are used. This lurching and inconsistent movement results from the compressibility of air and other gases, whereas hydraulic fluid is incompressible. By filling the cavity from its bottom portion upward, faults and malformations of the wax pattern are prevented. In addition, porosity of the wax blade and surface inconsistencies are avoided. Because the die segments are not compressed radially inward toward the central axis 15, they can be made of lighter and smaller structures. In addition, since the forces on the die segments 56 are limited to the region between surfaces 80 and 88, as illustrated in FIG. 6, the useful life of the die segments 56 and the guides 52 is extended dramatically.

Although alternative embodiments of the present invention are within its scope, the preferred embodiment described herein provides a significant improvement in the art of manufacturing wax patterns.

I claim:

1. A die assembly apparatus for making a component from a molten material, comprising:

a base plate;

a plurality of die segments which are combinable to form a die assembly with an internal cavity shaped to define said component;

a plurality of guides attached to said base plate, each of said plurality of guides being configured to define an associated one of a plurality of paths along which an associated one of said plurality of die segments can travel, each of said associated paths extending from an open position away from other ones of said plurality of die segments to a closed position proximate said other ones of said plurality of die segments, said plurality of die segments being combined to form said die assembly when all of said plurality of die segments are in said closed position, movement from said open position to said closed position for each one of said plurality of die segments being in a direction toward said base plate; and a compression member movable relative to said base plate, said compression member being configured to exert a force on said die assembly by moving toward said base plate with said die assembly disposed between said base plate and said compression member.

2. The apparatus of claim 1, further comprising:

a plurality of hydraulic actuators, each of said plurality of hydraulic actuators being attached to an associated one of said plurality of die segments and being configured to be pressurized to move said associated one of said plurality of die segments from said closed position to said open position and to be depressurized to move said associated one of said plurality of die segments from said open position to said closed position.

3. The apparatus of claim 2, wherein:

each of said plurality of hydraulic actuators has a pressure chamber attached to said associated one of said plurality of die segments and a shaft attached to said base plate.

4. The apparatus of claim 1, wherein:

said die assembly has at least one injection port disposed more proximate said base plate than said compression member, said injection port being connected in fluid communication with said cavity to conduct said molten material from an external source to said cavity.

5. The apparatus of claim 1, wherein:

said die assembly has at least one injection port disposed more proximate said compression member than said base plate, said injection port being connected in fluid communication with said cavity to conduct said molten material from an external source to said cavity.

6. The apparatus of claim 4, wherein:

said molten material is conducted from said external source when said compression member is disposed above said base plate.

7. The apparatus of claim 4, wherein:

said molten material is conducted from said external source when said compression member is disposed below said base plate.

8. The apparatus of claim 1, wherein:

said internal cavity is shaped to define a marine propeller.

9. The apparatus of claim 1, wherein;

said plurality of die segments comprises four independently movable die segments.

10. The apparatus of claim 1, wherein;

said plurality of die segments comprises three independently movable die segments.

11. A die assembly apparatus for making a marine propeller from molten wax, comprising:

a base plate;

a plurality of die segments which are combinable to form a die assembly with an internal cavity shaped to define said marine propeller;

a plurality of guides attached to said base plate, each of said plurality of guides being configured to define an associated one of a plurality of paths along which an associated one of said plurality die segments can travel, each of said associated paths extending from an open position away from other ones of said plurality of die segments to a closed position proximate said other ones of said plurality of die segments, said plurality of die segments being combined to form said die assembly when all of said plurality of die segments are in said closed position, movement from said open position to said closed position for each one of said plurality of die segments being in a direction toward said base plate;

a compression member movable relative to said base plate, said compression member being configured to exert a force on said die assembly by moving toward said base plate with said die assembly disposed between said base plate and said compression member; and a plurality of hydraulic actuators, each of said plurality of hydraulic actuators being attached to an associated one of said plurality of die segments and being configured to be pressurized to move said associated one of said plurality of die segments from said closed position to said open position and to be depressurized to move said associated one of said plurality of die segments from said open position to said closed position, each of said plurality of hydraulic actuators having a pressure chamber attached to said associated one of said plurality of die segments and a shaft attached to said base plate, said die assembly having at least one injection port disposed more proximate said base plate than said compression member, said injection port being connected in fluid communication with said cavity to conduct said molten wax from an external source to said cavity, said molten wax being conducted from said external source when said compression member is disposed above said base plate.

* * * * *